United States Patent
Borg

(10) Patent No.: US 6,754,382 B1
(45) Date of Patent: Jun. 22, 2004

(54) IDENTIFYING COLOR SPACES FROM COLOR SPECIFICATIONS

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 614 days.

(21) Appl. No.: 09/632,363

(22) Filed: Aug. 3, 2000

(51) Int. Cl.[7] .............................. G06K 9/00; G03F 3/08
(52) U.S. Cl. ........................................ 382/165; 358/523
(58) Field of Search ................................. 382/135, 162, 382/165, 167, 276, 295; 358/1.9, 515, 518, 525; 345/589, 600, 601, 603, 604, 764

(56) References Cited

U.S. PATENT DOCUMENTS

| | | | | |
|---|---|---|---|---|
| 4,580,134 A | * | 4/1986 | Campbell et al. ........... | 345/589 |
| 4,709,230 A | * | 11/1987 | Popowski et al. .......... | 345/601 |
| 5,787,193 A | * | 7/1998 | Balasubramanian ........ | 382/167 |
| 5,896,468 A | * | 4/1999 | Kowalski .................... | 382/264 |
| 5,930,387 A | * | 7/1999 | Chan et al. ................. | 382/166 |
| 6,204,939 B1 | * | 3/2001 | Lin et al. .................... | 358/518 |
| 6,385,337 B1 | * | 5/2002 | Klassen ...................... | 382/166 |
| 6,400,843 B1 | * | 6/2002 | Shu et al. ................... | 382/167 |
| 6,429,868 B1 | * | 8/2002 | Dehner et al. .............. | 345/440 |
| 6,518,981 B2 | * | 2/2003 | Zhao et al. ................. | 345/764 |
| 6,546,132 B1 | * | 4/2003 | Bhattacharjya et al. ..... | 382/167 |
| 6,580,820 B1 | * | 6/2003 | Fan ............................. | 382/135 |

* cited by examiner

*Primary Examiner*—Andrew W. Johns
*Assistant Examiner*—Amir Alavi
(74) *Attorney, Agent, or Firm*—Fish & Richardson P.C.

(57) ABSTRACT

A method for identifying an unknown color space from a color specification. The specification defines a transformation between the unknown color space and a well known color space. A set of well-separated test colors is selected. A test color space is selected. The test colors are represented in the test color space. The color specification is used to transform the test colors from the unknown color space to the well known color space. The properties of the well known component values of each of the test colors in the well known color space are used to determine if the color specification expressed a valid mapping from the test color space to the well known color space. Alternatively, the relationship between the component values for each of the test colors, or the relationship between the component values of different test colors is used to determine the validity of the mapping. If the mapping is valid, the unknown color space is identified as the test color space.

20 Claims, 3 Drawing Sheets

| Test color | Test Color Space | | | | | |
|---|---|---|---|---|---|---|
| | RGB | CMY | L*a*b* | YCC | CMYK | RGBW |
| Red | (1,0,0) | (0,1,1) | (50,50,50) | (0.3,-0.3,0.7) | (0,1,1,0) | (1,0,0,0) |
| Green | (0,1,0) | (1,0,1) | (50,-50,50) | (0.6,-0.6,-0.6) | (1,0,1,0) | (0,1,0,0) |
| Blue | (0,0,1) | (1,1,0) | (50,50,-50) | (0.1,0.9,-0.1) | (1,1,0,0) | (0,0,1,0) |
| Cyan | (0,1,1) | (1,0,0) | (50,-50,-50) | (0.7,0.3,-0.7) | (1,0,0,0) | (0,1,1,0) |
| Magenta | (1,0,1) | (0,1,0) | (50,50,0) | (0.4,0.6,0.6) | (0,1,0,0) | (1,0,1,0) |
| Yellow | (1,1,0) | (0,0,1) | (50,0,50) | (0.9,-0.9,0.1) | (0,0,1,0) | (1,1,0,0) |
| Black | (0,0,0) | (1,1,1) | (1,1,1) | (0,0,0) | (0,0,0,1) | (0,0,0,0) |

FIG. 2

| Test color | Test Color Space Representation | Transformation using color specification | CIE-XYZ Color Space Representation | Correct Color Space Criteria |
|---|---|---|---|---|
| Red | (Ar,Br,Cr) | | (Xr,Yr,Zr) | $Xr > Zr$ |
| Green | (Ag,Bg,Cg) | | (Xg,Yg,Zg) | $Xg < Yg$ |
| Blue | (Ab,Bb,Cb) | | (Xb,Yb,Zb) | $Zb > Yb$ |
| Cyan | (Ac,Bc,Cc) | | (Xc,Yc,Zc) | $Xc < Zc$ |
| Magenta | (Am,Bm,Cm) | | (Xm,Ym,Zm) | $Xm > Ym$ |
| Yellow | (Ay,By,Cy) | | (Xy,Yy,Zy) | $Zy < Yy$ |
| Black | (Ak,Bk,Ck) | | (Xk,Yk,Zk) | $Yk < Yb$, $\lvert Xk-Yk \rvert < 0.1$, and $\lvert Zk-Yk \rvert < 0.1$ |

FIG. 3

IDENTIFYING COLOR SPACES FROM COLOR SPECIFICATIONS

BACKGROUND OF THE INVENTION

The present invention generally relates to identifying color spaces used to represent colors. In particular, the invention relates to identifying an unknown color space from a color specification defining a transformation of a color from a representation in the unknown color space to a representation in a well known color space.

Many current applications use various page description languages, such as the Adobe® PostScript® language, to describe color spaces such as the CIE-basedABC, and CIE-based DEFG families of color spaces. CIE-based color spaces are color spaces defined with respect to international standards specified by the Commission Internationale de l' Éclairage (CIE). CIE-basedABC color spaces are so named because colors in the space are represented by three components, arbitrarily named A, B, and C. Similarly, CIE-basedDEFG color spaces are so named because colors in the space are represented by four components, arbitrarily named D, E, F, and G. A common CIE-basedABC color space is the RGB color space. The color components of a color represented in the RGB color space are derived from the tristimulus CIE XYZ values according to an RGB color model.

Many applications manipulate color images assuming the image colors are represented in a local, well known color space. When such applications process colors imported from an external file, they must first transform the colors from their representation in the color space of the external file into the local, well known color space. The parameters necessary to effect this transformation are often contained within the external file in the form of a color specification. Typically, the color specification parameterizes color transformation from the external color space to the CIE XYZ color space. While the color specification typically includes information allowing the transformation of colors from the external color space to the well known color space, it need not identify the external color space by name.

For example, in the PostScript language, a CIE-based color specification includes the name of a color space family (e.g., CIE-basedABC) and parameters that characterize a color space without naming the color space or identifying a particular color model (e.g., RGB). Conventionally, if a CIE-basedABC color space is not manually identified by a user, a PostScript interpreter assumes the color space is either the L*a*b* color space or the RGB color space, and interprets the color values accordingly. Similarly, if a CIE-basedDEFG color space is not manually identified by a user, a PostScript interpreter assumes the color space is the CMYK color space and interprets the color values accordingly. These assumptions can result in incorrect color processing and color conversion. Consequently, a method for identifying color spaces from color specifications is needed.

SUMMARY OF THE INVENTION

Advantages that can be seen in implementations of the invention include one or more of the following.

In one aspect, the invention enables a color space to be determined automatically from a color specification without user intervention. In another aspect, the invention allows an unknown color space to be determined from the color properties of a well known color space and a color specification defining the transformation of colors from the unknown color space to the well known color space.

Once the unknown color space is identified, an application can decide whether it is necessary to perform a color space conversion. For example, if an application determines that the color space corresponding to a received CIE-based color specification is a CMYK color space, the application may be configured to bypass a color space conversion step in order to preserve the gray component replacement percentage in the input CMYK color component values.

In a further aspect, the invention can be used to determine whether a user defined color space is valid. For example, the invention can be used to test and prevent the creation of invalid or unintended color profiles in applications which allow users to create color profiles. Thus the invention may be used to prevent a user from inadvertently creating a GRB color space while attempting to create an RGB or similar color space.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 is a table showing the representation of a set of test colors in a variety of color spaces.

FIG. 3 is a table showing a set of tests applied to a set of test colors transformed from an unknown color space to the CIE XYZ color space according to a received color specification.

Like reference numbers and designations in the various drawings indicate like elements.

DETAILED DESCRIPTION

Figure 1:
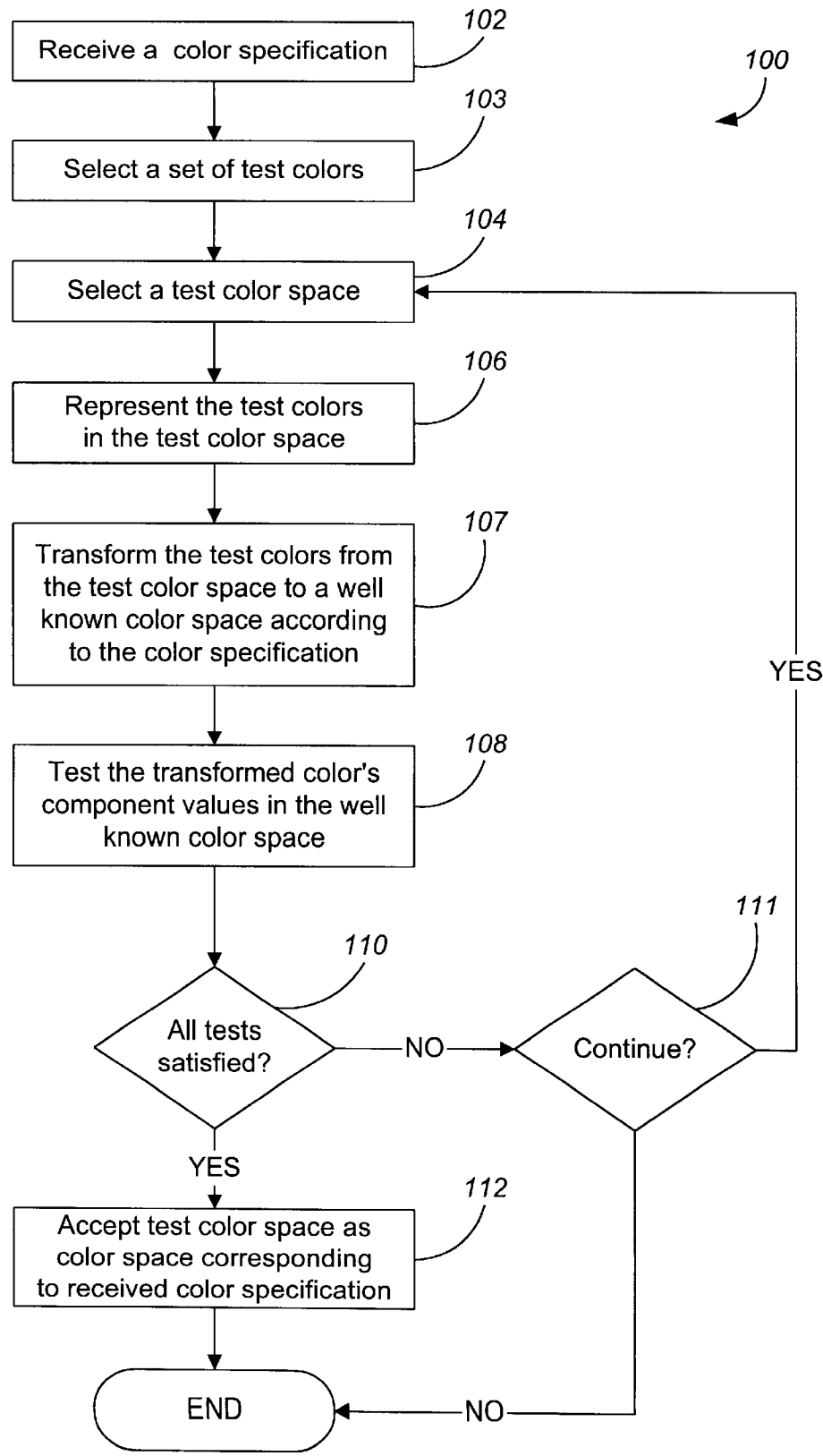
FIG. 1 is a flowchart of a color space determination process in accordance with the present invention.

FIG. 1 shows a color space determination process 100 implemented in a computer program in accordance with the present invention.

At step 102, process 100 receives as input a color specification containing parameters that characterize a color space without identifying it. The parameters received in the color specification define a transformation from a color's representation in one color space to its representation in another color space. In one implementation, the color specification is a CIE-based color specification. In one implementation, the parameters define a transformation from a color's representation in a CIE-based color space, such as a CIE-basedABC, CIE-basedDEF, or CIE-basedDEFG color space, to its representation in the CIE (XYZ) color space.

Colors in a CIE-basedABC or DEF color space are represented by three component values. Depending on the color model used to define the color space, a color's component value representation (ABC) may refer to, among others, any of (RGB), (CMY), (L*a*b*), (YCC), (L*u*v*), (Yxy), and (HSV). Similarly, colors in a CIE-based DEFG color space are represented by four component values. Depending on the color model used to define the color space, a color's component value representation (DEFG) may refer to, among others, any of (CMYK), (MCYK), and (RGBW). Because a color's component value representation (ABC), (DEF), or (DEFG) is different in different color spaces, it is desirable to identify the color space characterized by the parameters received in the color specification at step 102 to ensure correct interpretation and processing of the color.

At step 103, process 100 selects a set of test colors. In one implementation, the set of test colors selected is a set of well-separated colors in a test color space. A set of well-separated colors is a set of colors which encloses a large region of the test color space's gamut, and whose colors are separated by large distances in the XYZ color space. In one implementation, the set of test colors is chosen to be the corners of the RGBCMYK color cube: red, green, blue, cyan, magenta, yellow, and black. Other implementations are possible, however, and still within the scope of the claimed invention. For example, a set of test colors containing fewer or greater than 7 test colors is possible, and still within the scope of the invention. Similarly, a set of well-separated test colors other than RGBCMYK may be chosen, and still be within the scope of the invention. The set of test colors can be chosen by user input, or they can be predetermined.

At step 104, process 100 selects a test color space. In one implementation, the test color space is chosen by user input. In another implementation the test color space is chosen from a set consisting of all known color spaces. In one implementation, if the specification received at step 102 represents a CIE-basedABC or CIE-basedDEF color space, process 100 selects a three component color space such as the RGB color space as the test color space. If the color specification received at step 102 represents a CIE-basedDEFG color specification, process 100 selects a four component color space such as the CMYK color space as the test color space.

At step 106, process 100 represents each color in the set of test colors selected at step 103 in the test color space selected at step 104. For example, referring now to FIG. 2, the representation of the RGBCMYK set of test colors is shown in a variety of test color spaces. From the figure, the color red is represented as (1,0,0) in the RGB color space, as (0,1,1) in the CMY color space, and as (50,50,50) in the L*a*b* color space. Similarly, the color cyan is represented as (0,1,1) in the RGB color space, as (1,0,0) in the CMY color space, and as (50,-50,-50) in the L*a*b* color space. While the set of test color spaces disclosed in FIG. 2 are an exemplary set, other test color spaces may be used, and the invention neither depends upon, nor is limited by, the number or type of test color spaces used by process 100 in step 104.

At step 107, process 100 uses the color specification parameters of the unknown color space received at step 102 to transform the representation of each color in the set of test colors selected at step 103 from the test color space chosen at step 104 to a well known color space. A well known color space is one in which the component values of each of the test colors selected at step 103 are well known. Alternatively, a well known color space is one in which the relationship between component values for each of the test colors selected at step 103 are well known. Alternatively, a well known color space is one in which the relationship between component values of different test colors selected at step 103 are well known.

In one implementation the well known color space is the CIE XYZ color space. Referring now to FIG. 3, the representation of an exemplary set of test colors consisting of the corners of the RGBCMYK color cube is transformed from a CIE-basedABC color space to the CIE XYZ color space according to the color specification received at step 102. Well known color spaces other than the XYZ color space can be used at step 107. In one implementation, the RGB color space is used. This and other implementations are within the scope of the claimed invention, which is neither limited by, nor dependent upon the type of color space chosen to be the well known color space.

At step 108, referring back to FIG. 1, process 100 uses the known properties of the well known color space and the component values of each of the transformed test colors to determine whether the test color space chosen in step 104 corresponds to the color specification received in step 102. In one implementation, the well known color space is the CIE XYZ color space. Referring now to FIG. 3, an exemplary set of tests applied to the component values of each of the transformed test colors is shown in the last column of the figure. Thus the color red is correctly transformed from the test color space to the XYZ color space if and only if the X component of the transformation, Xr, is greater than the Z component of the transformation, Zr, as shown in the table. Similarly, the color yellow is correctly transformed from the test color space if the Z component of its transformation, Zc, is less than the Y component, Yc.

While the tests depicted in FIG. 3 represent a set of exemplary tests, other tests are possible and still within the scope of the invention. For example, process 100 can be configured to use a tighter or a more relaxed set of tests than the set disclosed in FIG. 3. Thus, the test for the color cyan can be replaced by $Xc<Zc+\alpha$, where $\alpha$ is a pre-determined constant. Or, the test for the color green can be replaced by $Xg<Yg*k$, where k is a pre-determined constant. Still other implementations are possible, and within the scope of the claimed invention.

Different well known color spaces are used in different implementations. Thus in one implementation the RGB color space is used. In another implementation the CMY color space is used. The set of tests performed on the component values of each transformed color in the set of test colors will be different for different well known color spaces. An exemplary set of tests will take advantage of the well known component values of each of the test colors in the well known color space, or the relationship between component values for each of the test colors, or the relationship between component values of different test colors as previously discussed.

At step 110, process 100 checks whether all of the tests performed at step 108 on each test color's transformed component values are satisfied. If all of the tests are satisfied, process 100 identifies the color specification received at step 102 as a valid transformation from the test color space to the well known color space. Consequently, process 100 identifies the test color space as the unknown color space. If any of the tests are not satisfied, process 100 may either terminate the color space determination algorithm at step 111, or repeat it by selecting a different test color space at step 104.

The disclosed invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, optical disks, and solid state memory, such as flash memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASIC's (application-specific integrated circuits). The term "computer" applies to programmable or programmed system, such as is found in a workstation, desktop computer, notebook computer, handheld computer, personal digital assistant (PDA), or mobile phone.

The invention has been described in terms of particular embodiments. Other embodiments are within the scope of the following claims. For example, the steps of the invention can be performed in a different order and still achieve desirable results. The invention can be used to determine whether a test color space corresponds to the color specification parameters of an unknown color model in an International Color Consortium (ICC) color profile. ICC color profiles provide color management systems with a series of base algorithmic models and parameters used to convert color values from a three-component color space (generically named "3CLR") or a four-component color space (generically named "4CLR") to a standard color space such as the RGB color space. The invention can be used to determine whether a test color space corresponds to the color model parameters received in a color specification.

The invention as described is used to identify an unknown color space and color model from the received color specification parameters used to characterize the color space. The invention can also be used to verify that a given color space is represented by a set of color specification parameters by using the given color space as the test color space at step 104 and performing the verification or identification steps described at steps 106 through 108.

What is claimed is:

1. A method for identifying a color space from a color specification, comprising:

receiving a color, specification, the color specification defining a mapping from an unknown color space to a well known color space;

selecting a test color space, wherein the test color space is a color space used to identify the unknown color space;

using the color specification to map the color components of a set of test colors from a representation in the test color space to a representation in the well known color space;

using the color components of the set of test colors as represented in the well known color space to determine whether the color specification has correctly mapped the set of test colors from the representation in the test color space to the representation in the well known color space; and identifying the unknown color space as the test color space when the color specification has correctly mapped the set of test colors from the representation in the test color space to the representation in the well known color space.

2. The method of claim 1, wherein the test color space is one of (RGB), (CMY), (L*a*b*), (YCC), (L*u*v*), (Yxy), (HSV), (CMYK), (MCYK), or (RGBW).

3. The method of claim 1, wherein the set of test colors comprises a set of colors that are well-separated in the test color system.

4. The method of claim 3, wherein the set of well separated test colors comprises the seven colors representing the corners of an RGBCMYK color cube.

5. The method of claim 1, wherein the received color specification is one of a CIE-based color specification, a CIE-basedABC color specification, a CIE-basedDEF color specification, a CIE-basedDEFG color specification, or an ICC color profile.

6. A method for verifying an association between a stated color space and a color specification, the method comprising:

receiving a stated color space;

receiving a color specification, the color specification tentatively defining a mapping from the stated color space to a well known color space;

using the color specification to map the color components of a set of test colors from a representation in the stated color space to a representation in the well known color space;

using the color components of the set of test colors as represented in the well known color space to determine whether the color specification has correctly mapped the test colors from the representation in the stated color space to the representation in the well known color space; and verifying the association between the stated color space and the color specification when the color specification has correctly mapped the set of test colors from the representation in the stated color space to the representation in the well known color space.

7. The method of claim 6, wherein the stated color space is one of (RGB), (CMY), (L*a*b*), (YCC), (L*u*v*), (Yxy), (HSV), (CMYK), (MCYK), or (RGBW).

8. The method of claim 6, wherein the set of test colors comprises a set of colors that are well-separated in the test color system.

9. The method of claim 8, wherein the set of well separated test colors comprises the seven colors representing the corners of an RGBCMYK color cube.

10. The method of claim 6, wherein the received color specification is one of a CIE-based color specification, a CIE-basedABC color specification, a CIE-basedDEF color specification, a CIE-basedDEFG color specification, and an ICC color profile.

11. A computer program product, stored on a machine-readable medium, comprising instructions operable to cause a programmable processor to:

receive a color specification, the color specification defining a mapping from an unknown color space to a well known color space;

select a test color space, wherein the test color space is a color space used to identify the unknown color space;

use the color specification to map the color components of a set of test colors from a representation in the test color space to a representation in the well known color space;

use the color components of the set of test colors as represented in the well known color space to determine whether the color specification has correctly mapped the set of test colors from the representation in the test color space to the representation in the well known color space; and identify the unknown color space as the test color space when the color specification has correctly mapped the set of test colors from the representation in the test color space to the representation in the well known color space.

12. The product of claim 11, wherein the test color space is one of (RGB), (CMY), (L*a*b*), (YCC), (L*u*v*), (Yxy), (HSV), (CMYK), (MCYK), or (RGBW).

13. The product of claim 11, wherein the set of test colors comprises a set of colors that are well-separated in the test color system.

14. The product of claim 13, wherein the set of well separated test colors comprises the seven colors representing the corners of an RGBCMYK color cube.

15. The method of claim 11, wherein the received color specification is one of a CIE-based color specification, a CIE-basedABC color specification, a CIE-basedDEF color specification, a CIE-basedDEFG color specification, and an ICC color profile.

16. A computer program product, stored on a machine-readable medium, comprising instructions operable to cause a programmable processor to:

receive a stated color space;

receive a color specification, the color specification tentatively defining a mapping from the stated color space to a well known color space;

use the color specification to map the color components of a set of test colors from a representation in the stated color space to a representation in the well known color space;

use the color components of the set of test colors as represented in the well known color space to determine whether the color specification has correctly mapped the test colors from the representation in the stated color space to the representation in the well known color space; and verify the association between the stated color space and the color specification when the color specification has correctly mapped the set of test colors from the representation in the stated color space to the representation in the well known color space.

17. The product of claim 16, wherein the stated color space is one of (RGB), (CMY), (L*a*b*), (YCC), (L*u*v*), (Yxy), (HSV), (CMYK), (MCYK), or (RGBW).

18. The product of claim 16, wherein the set of test colors comprises a set of colors that are well-separated in the test color system.

19. The product of claim 18, wherein the set of well separated test colors comprises the seven colors representing the corners of an RGBCMYK color cube.

20. The product of claim 16, wherein the received color specification is one of a CIE-based color specification, a CIE-basedABC color specification, a CIE-basedDEF color specification, a CIE-basedDEFG color specification, and an ICC color profile.

* * * * *

UNITED STATES PATENT AND TRADEMARK OFFICE
CERTIFICATE OF CORRECTION

PATENT NO. : 6,754,382 B1
DATED : June 22, 2004
INVENTOR(S) : Lars U. Borg

It is certified that error appears in the above-identified patent and that said Letters Patent is hereby corrected as shown below:

Column 5,
Line 55, replace "receiving a color, specification," with -- receiving a color specification, --

Signed and Sealed this

Ninth Day of November, 2004

JON W. DUDAS
*Director of the United States Patent and Trademark Office*